(12) United States Patent
Tattan et al.

(10) Patent No.: US 7,702,918 B2
(45) Date of Patent: Apr. 20, 2010

(54) DISTRIBUTED NETWORK SYSTEM USING BIOMETRIC AUTHENTICATION ACCESS

(75) Inventors: Oliver Tattan, Enniskerry (IE); Michael Peirce, Ranelagh (IE)

(73) Assignee: Daon Holdings Limited, George Town (KY)

( * ) Notice: Subject to any disclaimer, the term of this patent is extended or adjusted under 35 U.S.C. 154(b) by 747 days.

(21) Appl. No.: 10/483,141

(22) PCT Filed: Jul. 2, 2002

(86) PCT No.: PCT/IE02/00095

§ 371 (c)(1),
(2), (4) Date: Jan. 7, 2004

(87) PCT Pub. No.: WO03/009111

PCT Pub. Date: Jan. 30, 2003

(65) Prior Publication Data

US 2004/0250085 A1    Dec. 9, 2004

Related U.S. Application Data

(60) Provisional application No. 60/305,864, filed on Jul. 18, 2001.

(30) Foreign Application Priority Data

Jul. 18, 2001    (EP)    ................................. 01650087

(51) Int. Cl.
*G06F 21/00*    (2006.01)
(52) U.S. Cl. ............................... 713/186; 726/2; 726/3; 726/4; 726/5; 726/7; 726/8

(58) Field of Classification Search ................. 713/186; 726/2–5, 7, 8
See application file for complete search history.

(56) References Cited

U.S. PATENT DOCUMENTS

| | | | | |
|---|---|---|---|---|
| 5,944,824 | A | * | 8/1999 | He .................................. 726/6 |
| 6,105,131 | A | | 8/2000 | Carroll |
| 6,157,707 | A | * | 12/2000 | Baulier et al. ................ 379/189 |
| 6,208,973 | B1 | * | 3/2001 | Boyer et al. .................... 705/2 |

(Continued)

FOREIGN PATENT DOCUMENTS

EP    0 917 119 A2    5/1999

(Continued)

OTHER PUBLICATIONS

Bruce Schneier, Applied Cryptography, 1996, John Wiley & Sons, Second Edition, p. 486.*

(Continued)

*Primary Examiner*—Benjamin E Lanier
*Assistant Examiner*—Cordelia Kane
(74) *Attorney, Agent, or Firm*—Kevin McDermott, Esq.

(57) ABSTRACT

A distributed network of independently operable servers is provided. Each server is adapted to communicate over the network with at least one of the other servers and has a datastore with a plurality of datafields adapted to store information about at least one user. By enabling an authentication of a user based on a user supplied biometric identifier, the network is adapted to enable the transfer of information relating to the user between different servers.

23 Claims, 7 Drawing Sheets

U.S. PATENT DOCUMENTS

| | | | |
|---|---|---|---|
| 6,289,113 B1 * | 9/2001 | McHugh et al. | 382/117 |
| 6,697,947 B1 * | 2/2004 | Matyas et al. | 713/182 |
| 6,728,881 B1 * | 4/2004 | Karamchetty | 713/186 |
| 6,963,579 B2 * | 11/2005 | Suri | 370/420 |
| 2003/0005337 A1 * | 1/2003 | Poo et al. | 713/202 |

FOREIGN PATENT DOCUMENTS

| | | | |
|---|---|---|---|
| EP | 917119 A2 * | 5/1999 | |
| WO | WO 0111845 | 2/2001 | |

OTHER PUBLICATIONS

Bruce Schneier, Applied Cryptography, 1996, John Wiley & Sons, Second Edition, p. 486.*

"Customer Relationship Management" http://en.wikipedia.org/wiki/Customer Relationship Management, Sep. 22, 2008.

* cited by examiner

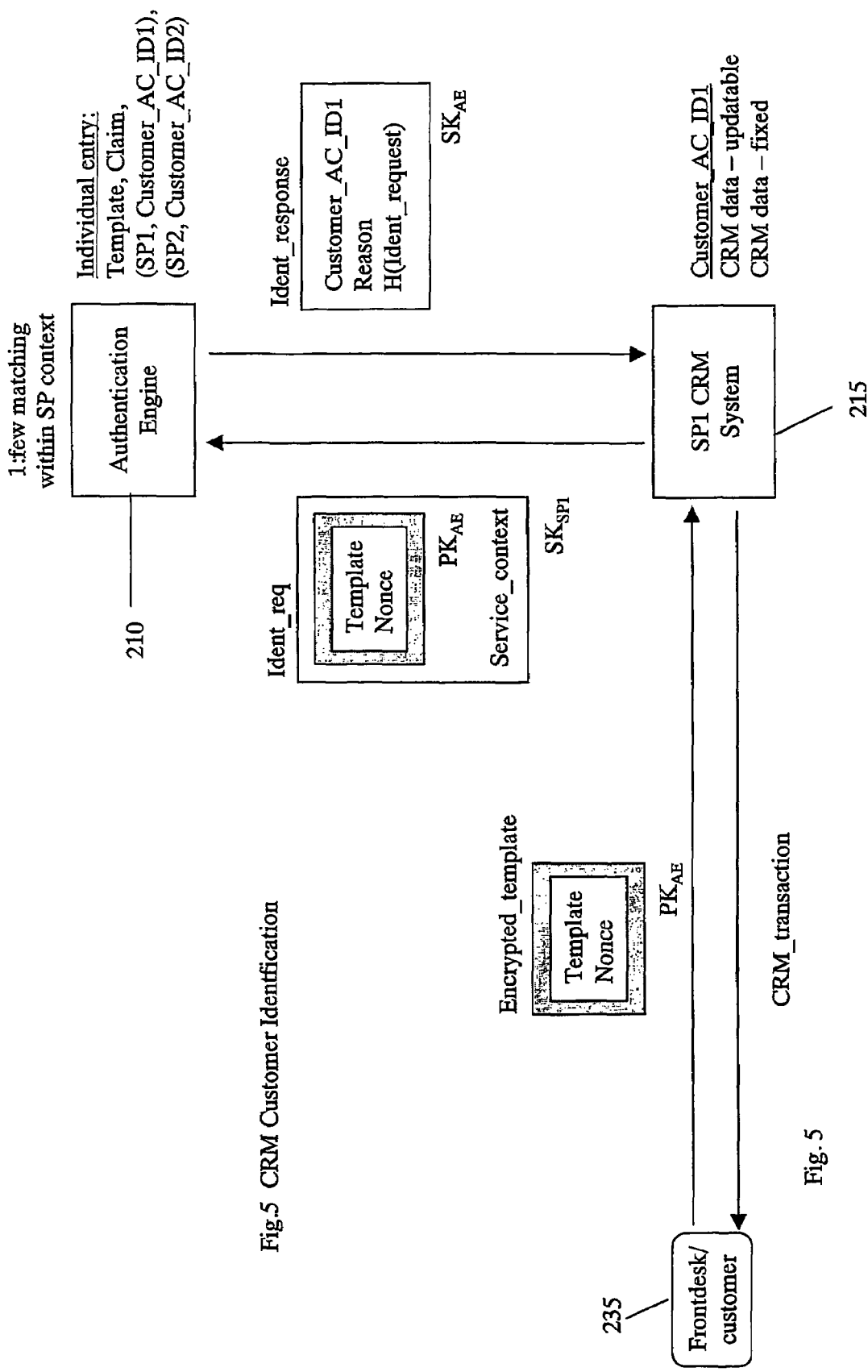
Fig.5 CRM Customer Identification

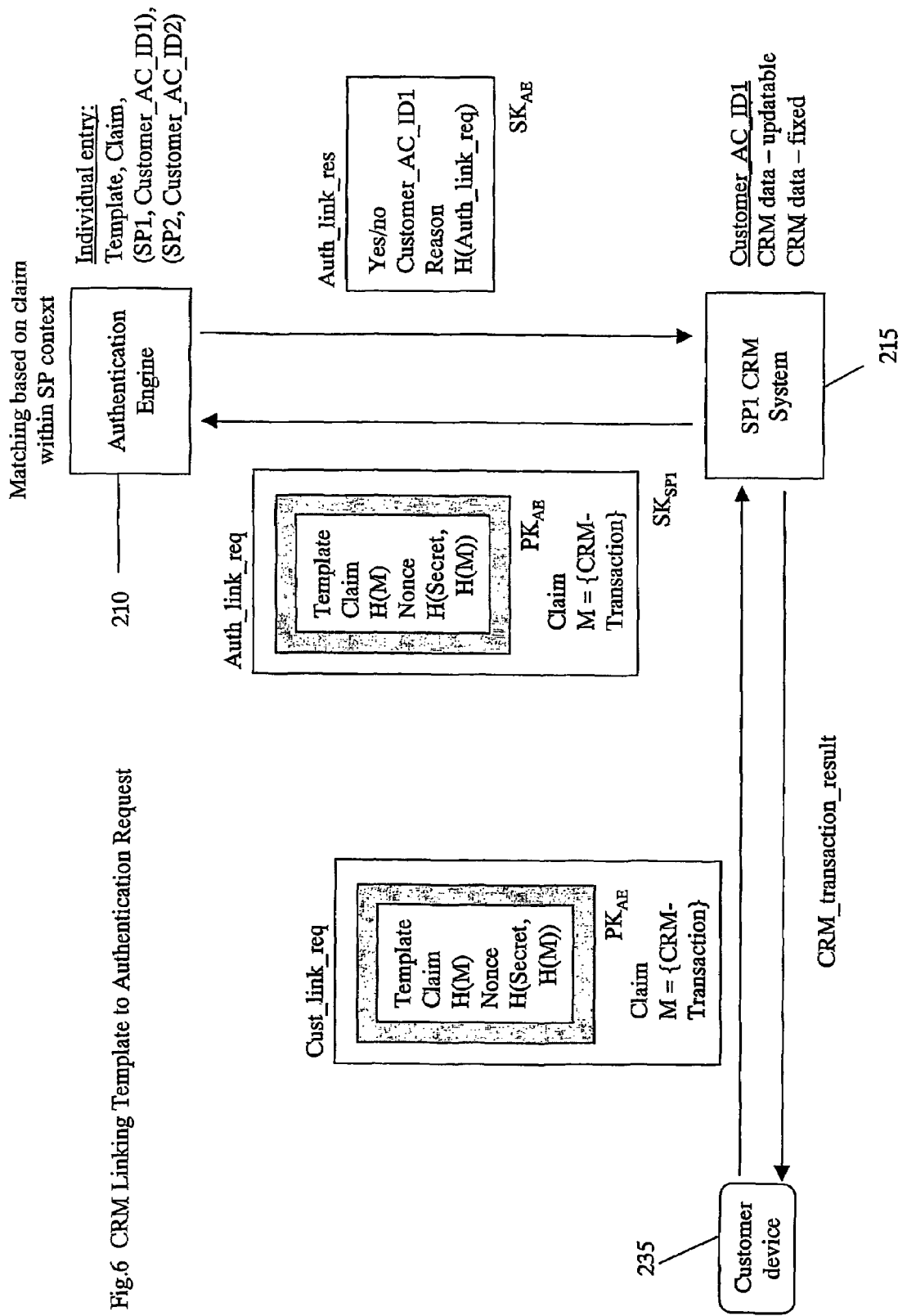
Fig.6 CRM Linking Template to Authentication Request

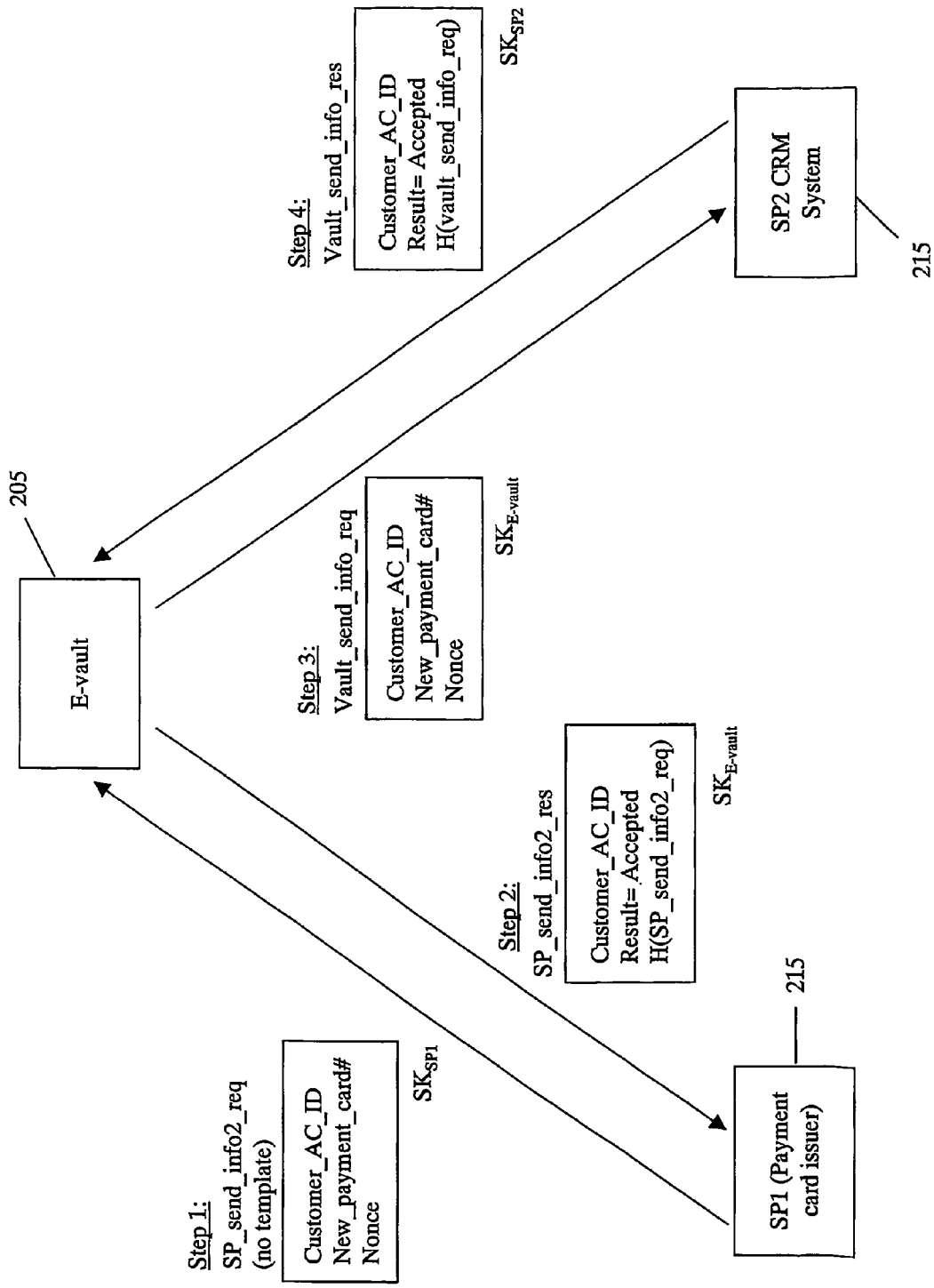
Fig.7 Automatic Customer Payment Card Update Through E-vault

DISTRIBUTED NETWORK SYSTEM USING BIOMETRIC AUTHENTICATION ACCESS

RELATED APPLICATION

The present application claims priority of U.S. Provisional Application No. 60/305,864 filed Jul. 18, 2001 entitled DISTRIBUTED NETWORK SYSTEM USING BIOMETRIC AUTHENTICATION ACCESS and also European Patent Application No. 01650087.8 filed Jul. 18, 2001, through PCT/IE02/00095 filed Jul. 2, 2002.

This application is the National Stage of International Application No. PCT/IE02/00095, filed Jul. 2, 2002, which claims the priority benefit of U.S. Provisional Application No. 60/305,864 filed Jul. 18, 2001.

BACKGROUND OF THE INVENTION

1. Field of the Invention

The invention relates to a distributed network of servers or entities, each having user specific information that may be shared across the network. The system is particularly concerned with the management of customer relationships with one or more service providers.

2. Description of the Related Art

At present, organizations hold an increasingly large and complex amount of information about individual customers. There is a significant administrative overhead in managing, updating, and correlating a customer's information. As a result, within any single organization, different departments may have different disparate and segmented views of the same individual customer.

Within many organisations there is a problem with maintaining an accurate and up to date view of a customer across all internal systems. The number of customer transactions and the volume of data collected from those transactions can be very high. In addition, there can be a wide variety of different data collected depending on the application. Over time, new data fields will be required, and old fields may be eventually discarded. Therefore customer information is both increasing in size and complexity. For example, Customer Relationship Management (CRM) data held on a hotel customer will include standard details such as name, address, dates of previous stays, and payment card details, but might also include preferred room type and location, hotel facilities used, and feedback history.

If customers have dealt with a particular service provider (SP) before they will expect to be recognized in all future transactions and treated appropriately. They do not want to have to repeat information that they have already disclosed. For example, any change of address or preferred payment method must be reflected in all future transactions. In turn, this increases customer satisfaction and helps retain customers. A few regular customers can generate more revenue than many infrequent customers. In order to provide this service a large administrative burden is placed on the SP in order to keep customer details up to date, and to cater for the complex data sets.

EP 0 917 119 describes a distributed network based wallet system that is adapted for a provision of a safe, secure and properly authorized transfer of information while preserving individual privacy. The system provides a centralised storage depot for storing personal information about a person, yet differentiates between the type of information that may be accessed by third parties.

U.S. Pat. No. 6,105,131 is also concerned about the secure processing of sensitive customer information over distributed networks such as the internet. This system provides such security by storing the user data and processes in vaults only accessible by an authenticated user.

The latter two disclosures base their treatment of the user information on a central depot for the information which is then accessible by a user or third party on authentication of same. This requirement for central storage means that the datastore associated with the user needs constant updating of information in order to have everyday use or applicability. It further requires high level of trust between users of the system as all users are accessing the master datastore and although their privileges may be restricted using security protocols and the like there is a possibility of corruption of an entire dataset, and subsequent loss of all information pertinent to the user.

In addition to the multiple storage of information relating to customers it is also known to provide loyalty cards, which identify a specific customer account, to the customer in order to track transactions and reward frequent patrons. However, this results in a number of such cards and tokens being required by the customer for each and every service provider (SP) with whom they interact. FIG. 1 is an example, in a high-level block diagram format, illustrating how existing prior art customer relationship management systems fail to obtain a unified view of the customer and require use of a multitude of different customer identification tokens.

Conventional loyalty cards are not easy to deploy as typically a lengthy application procedure must be followed by the customer. The loyalty card usually takes the form of a physical plastic magnetic stripe card or smart card. In addition, each SP issues their own loyalty card, requiring the user to apply and carry a new card for every single SP they interact with, as is shown in FIG. 1.

There is therefore a need to provide a system and method that enables a user to easily interface with a plurality of service providers in a secure manner. There is a further need to provide a system that provides for a single authentication of the user and the subsequent use of that authentication across a wide platform of independently operable servers as operated by different service providers.

SUMMARY OF THE INVENTION

Accordingly, the present invention provides a management system that is adapted to use a customer's biometric features to uniquely identify or verify that customer to any number of service providers (SP), removing the need for customer loyalty cards and tokens, and allowing secure and efficient authenticated access and updating of customer data held by the SP. Desirably this data is CRM type data that is associated with the user.

In a preferred embodiment a distributed network of independently operable servers is provided with each server adapted to communicate over the network with one or more other servers. Each server is provided with a datastore with a plurality of datafields and is adapted to store information about one or more users. The network additionally incorporates an authentication engine adapted to enable an authentication of the identity of a user based on a user provided biometric identifier, and the network is adapted to enable the communication of information relating to a user between two or more independently operable servers in response to authentication of the user by the authentication engine.

Such a network configuration enables the sharing of related information between independent operators or service providers in a secure manner based on the authentication of the user on a user provided biometric identifier.

Desirably the provision of the identifier to the authentication engine by the user is via at least one server, the biometric being encrypted such that only the authentication engine can obtain access to the presented biometric. Such a "tunnelling" of the identifier directly to the authentication engine via the service provider ensures that the identifier cannot be tampered or interfered with, thereby improving the security and confidence provided to the user.

The identifier is typically routed directly to the authentication engine from the server with which the user is interacting, although in certain embodiments the identifier is routed to the authentication engine through at least one other server from the server with which the user is interacting.

The biometric identifier is typically accompanied by a claim identity, both the biometric identifier and claim identity being linkable to a unique user and wherein the authentication engine utilises both the identity and identifier to effect authentication of the user. However, the authentication engine may be adapted to perform authentication of a user, where no additional user claim of identity is presented, on the basis of effecting a match between the submitted biometric identifier and one or more enrolled biometric identifiers stored within the authentication engine.

Desirably a first server within the network includes a generic datastore providing a generic dataset of information relevant to the user, which may be required by other servers, the network being configured such that the first server may be accessed by other servers. Such a server performs the function of a "home server" or evault for that user. The information stored may include configuration information relevant to how information in the network may be shared between servers.

The network may be further adapted to provide a plurality of authentication engines, each of the authentication engines adapted to communicate over a trusted communication link, whereby authentication by a user at a first authentication engine may be accepted by a second authentication engine as authentication for that second authentication engine. The authentication engines are desirably configured such that if a request for authentication of a user is received at a first engine and that first engine is not capable of authenticating that user, the first authentication engine is adapted to forward the request to a second authentication engine, which on authentication of the user is adapted to respond to the first authentication engine confirming authentication.

Typically, the information relating to the one or more users is of the sort of information defined as customer relationship management information.

The plurality of servers are desirably configured such that any updating of information in a datastore of a first server is communicated to at least a second server so as to update the user information in that server.

The sharing of information between servers is typically controlled by a set of policies and configurations determined by the user and stored at one of the servers.

The authentication engine is desirably configured to store or receive a plurality of templates for use in the authentication of a user, the templates varying in either the biometric sample type that was used to create that template or offering different templates for the same sample type.

Such a provision of multiple templates can then be matched against one or more presented claims to enable the authentication engine to utilise multi-modal authentication means for a user or to use an alternative template for authentication if and when a first template is corrupted or fails to match.

Preferably the biometric is provided in a template incorporating a biometric sample or values derived from it, the template being encrypted with the public key of the authentication engine.

The authentication engine may be adapted to store a plurality of datastore claim identities, each datastore identity being associated with a server, and wherein on receiving a biometric identifier associated with a user from a server for authentication, the authentication engine is adapted to associate the server with one or more of the stored datastore claim identities and return an appropriate claim identity to the server upon authentication of the user.

In one embodiment one or more of the servers may be adapted to enable a transaction to be conducted between a user and the service provider in a first time period, the completion of the transaction effecting the association of a biometric identifier uniquely associated with the user with the transaction, and wherein the server is adapted to enable a subsequent authentication of that associated biometric by an authentication engine so as to authenticate the user. Such a delay between the transaction and the authentication of the transaction enables the use of "off-line signing" where the absence of a communication link to an authentication engine does not hinder the interaction between the user and a server of the service provider. The transaction may be conducted and then one or more transactions batched for subsequent authentication by the authentication engine.

The invention additionally provides a method of sharing user specific information over a distributed network. The method includes the steps of: providing a central datastore of generic user information, and providing a plurality of remotely located datastores, where each of the remotely located datastores having specific user information storeable thereon. Moreover, the method includes providing an authentication engine adapted to authenticate a user on the basis of presented biometric identifier, and enabling the user to access the network via any of the datastores. Each of the remotely located datastores includes an address for the central datastore and the central datastore includes configuration information for transferring information between the distributed datastores. On initially accessing the datastore, a user is authenticated with the authentication engine and can then update information at any one of the datastores. It should be appreciated that updating of the information effects an updating of related information on any one of the other datastores.

According to another embodiment of the invention, there is provided a customer relationship management (CRM) system comprising a database of CRM data, an interface for interfacing with customers to capture CRM data, and a CRM processing means for processing the CRM data to allow enhanced customer interaction. The database stores a single dataset associated with each customer.

In one embodiment, the interface comprises means for authenticating a customer without use of a physical token.

In another embodiment, the interface comprises means for performing biometric customer authentication.

In a further embodiment, the interface comprises means for receiving a template incorporating a biometric sample, the template being encrypted with the public key of an authentication engine, and for routing the encrypted template to the authentication engine.

In one embodiment, the interface comprises means for allowing customer access to the database to view CRM data.

In another embodiment, the interface comprises means for allowing customer access to update CRM data.

In a further embodiment, the interface comprises means for interfacing with a vault centrally storing customer data.

In one embodiment, the interface comprises means for automatically updating the vault with fresh customer data received from a customer.

In another embodiment, the interface comprises means for receiving and registering a profile defining rules for CRM data.

In one embodiment, the rules govern how the CRM data may be shared.

In another embodiment, the database comprises means for associating a group of customers or customer users with a single dataset of CRM data.

In another aspect, the invention provides a customer relationship management system including means for interfacing with customers to allow viewing and updating of CRM data and means for accessing a separate central database for retrieving customer data. Moreover, the customer relationship management system includes means for storing CRM data in a CRM database and means for accessing a remote authentication engine using a received customer biometrics template to perform customer authentication for data access.

The invention will be more clearly understood from the following description of some embodiments thereof, given by way of example only, with reference to the accompanying drawings.

BRIEF DESCRIPTION OF THE DRAWINGS

FIG. 5 is a message flow diagram showing a CRM customer being identified through a SP;

FIG. 6 is a message flow diagram that shows how a customer authentication request is linked with the CRM transaction, a form of biometric signature; and FIG. 7 is a message flow diagram that shows how a payment card issuer automatically updates customer information at the e-vault, which in turn is automatically distributed to another SP requiring that information.

DETAILED DESCRIPTION OF THE INVENTION

Figure 1:
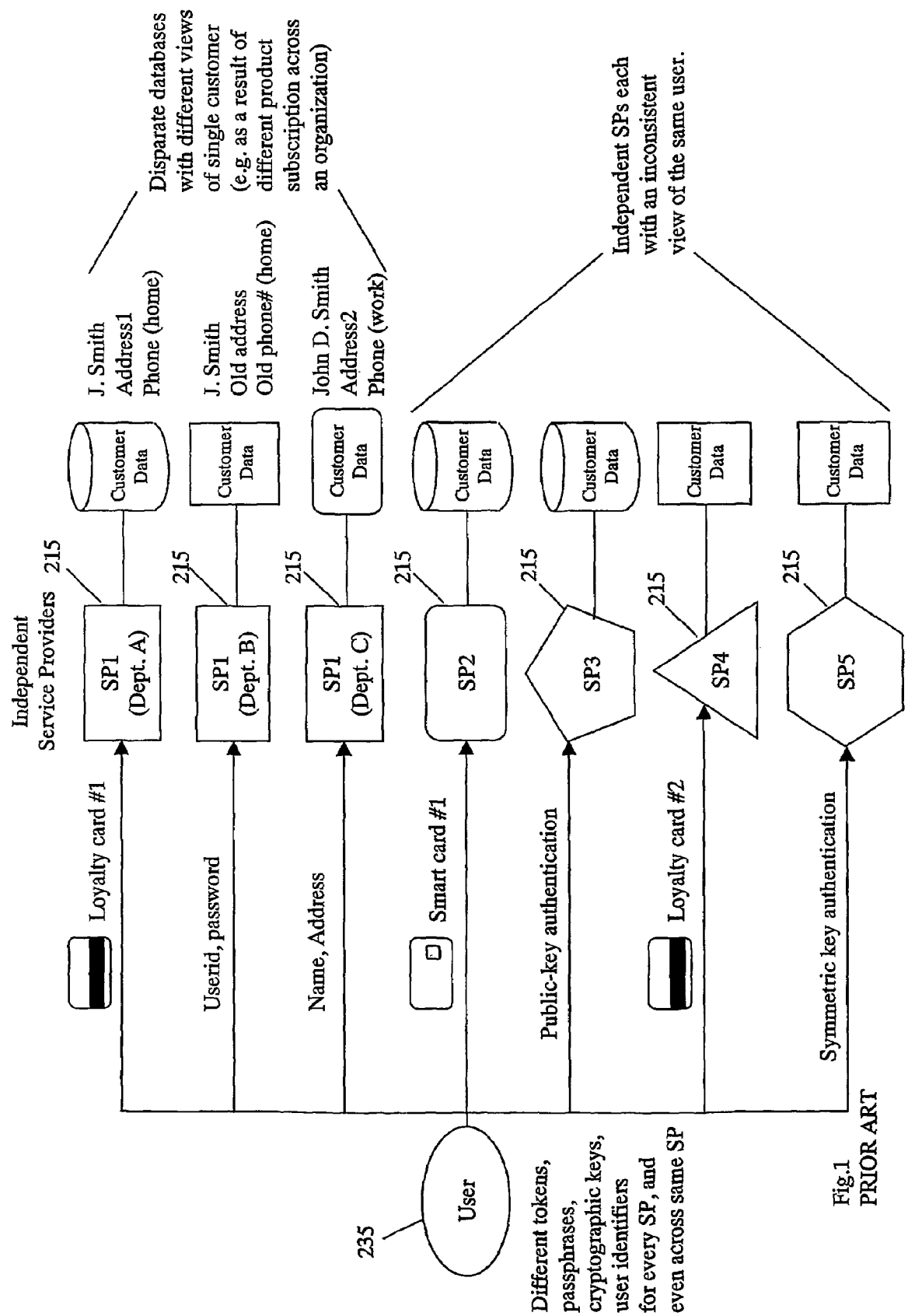
FIG. 1 is a high-level block diagram illustrating how existing prior art customer relationship management systems fail to obtain a unified view of the customer and require use of a multitude of different customer identification tokens.

FIG. 1 has been described with reference to the prior art.

Referring to the FIGS. 2 to 7 of the drawings, a distributed network according to the present invention provides a plurality of co-operable but independently operable servers, which desirably form a Customer Relationship Management System (CRM), creates a single co-operating view among sales, marketing, and customer-service activities within an organization in order to obtain and retain customers. The system is also expandable across multiple non-related organisations so that a user can enable sharing of his personal profiles and data between organisations or service providers in a secure manner. It overcomes the major problems of keeping an accurate updated view of the customer, and conveniently identifying the customer across all transactions. In addition, unique user data need only be entered once into the system, and may be propagated to the appropriate service providers, if and when it is updated, as defined by the user.

Figure 2:
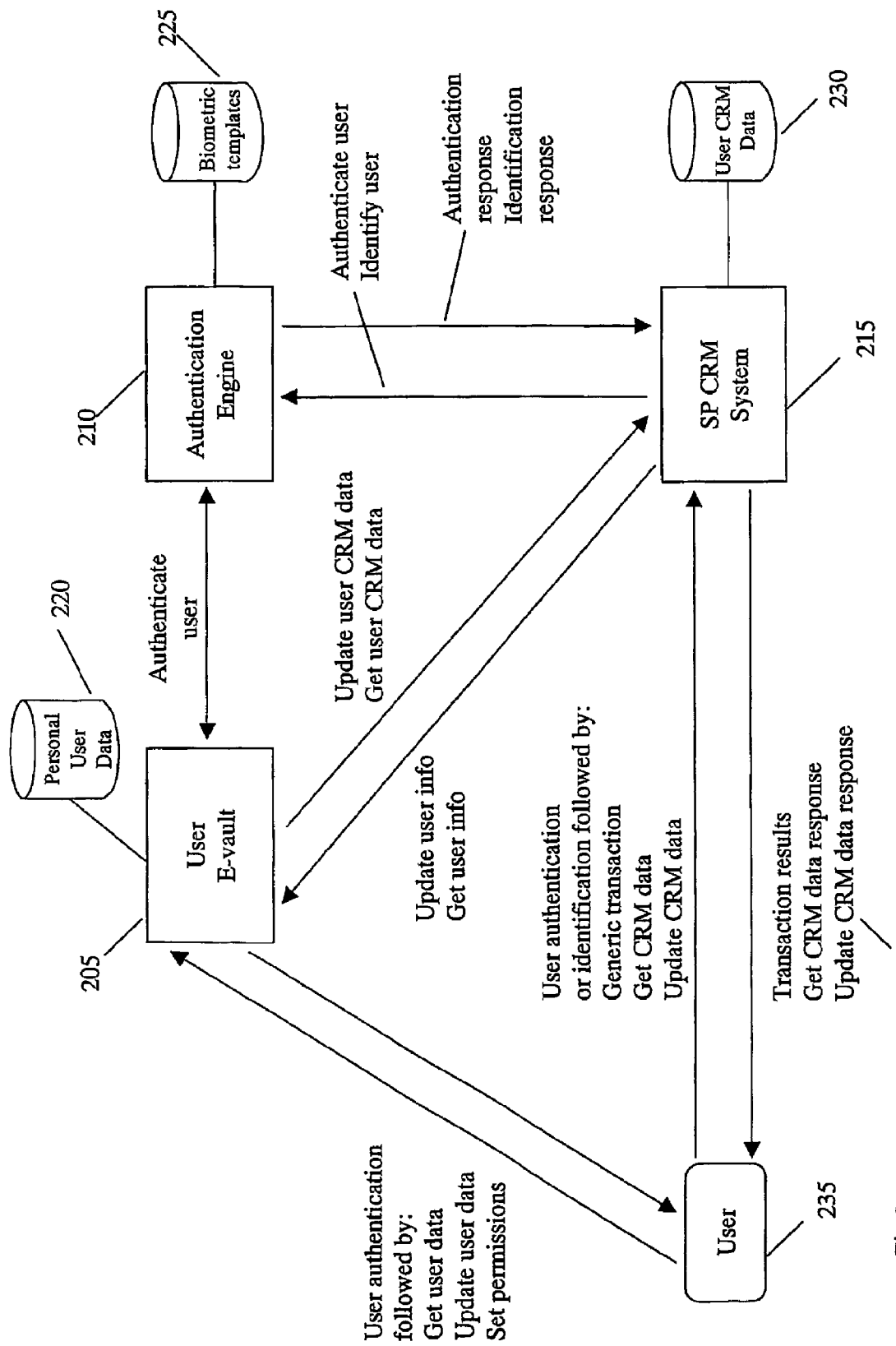
FIG. 2 is a diagram showing the components and functional message flows between entities within a system of the invention.

As shown in FIG. 2, the CRM system 200 of the present invention provides a distributed network of servers, each server being linkable so as to enable a sharing of information related to a specific customer or user. The term server is not meant to be limited to the singular as it will be appreciated by those skilled in the art that the functionality provided by a single service provider may be implemented using two or more linked pieces of hardware.

The system 200 includes a central data store ("e-vault") 205 adapted to store a single CRM dataset, such as name/address/date of birth etc., for each customer. This single CRM dataset is typically a generic set of data that could have application to any one of a plurality of service providers. The evault 205 is linkable over a network communication link with an authentication engine (AE) 210 for authentication of users. Biometric authentication is defined to include both the identification of a user from a plurality of possible users (1:N) by presenting only one or more biometric samples and the verification of a user, where a claim is presented along with one or more biometric samples allowing a single comparison (1:1) to be made to verify the claimed identity of that user. The system also includes at least one independently operable service provider 215, which is adapted to store user data specific to that service provider on one or more servers. It will be appreciated therefore that each of the evault, authentication engine and service providers are adapted to provide art interface to data specific to a user. The evault provides access to a datastore 220 for storing generic or shareable data, the authentication engine has a datastore 225 for storing biometric templates against which a user will be authenticated and the service provider has a datastore 230 with service provider specific user information. Each of the evault, authentication engine and service provider can communicate with one another so as to share information relating to a specific user. It will be appreciated that although FIG. 2 shows the incorporation of a single service provider that two or more service providers can be implemented within the distributed network of the present invention.

A user 235 presents themselves to the system by presenting a claim of identity and also a biometric identifier, The authentication engine is adapted to specifically authenticate the user based on a comparison of the biometric identifier presented with one previously stored for that user. On the basis of authentication the user may be provided with access to the system of the invention. The user may present himself for authentication through either the evault or one of the service providers, and once authenticated can then access multiple entities within the network. Where the accuracy of the biometric technology permits, or through use of multiple biometrics, the authentication engine may perform identification of a user, where no additional user claim of identity is presented, and one or more enrolment templates within the authentication engine are compared against the submitted templates to find the one that matches and therefore identifies the user.

Figure 3:
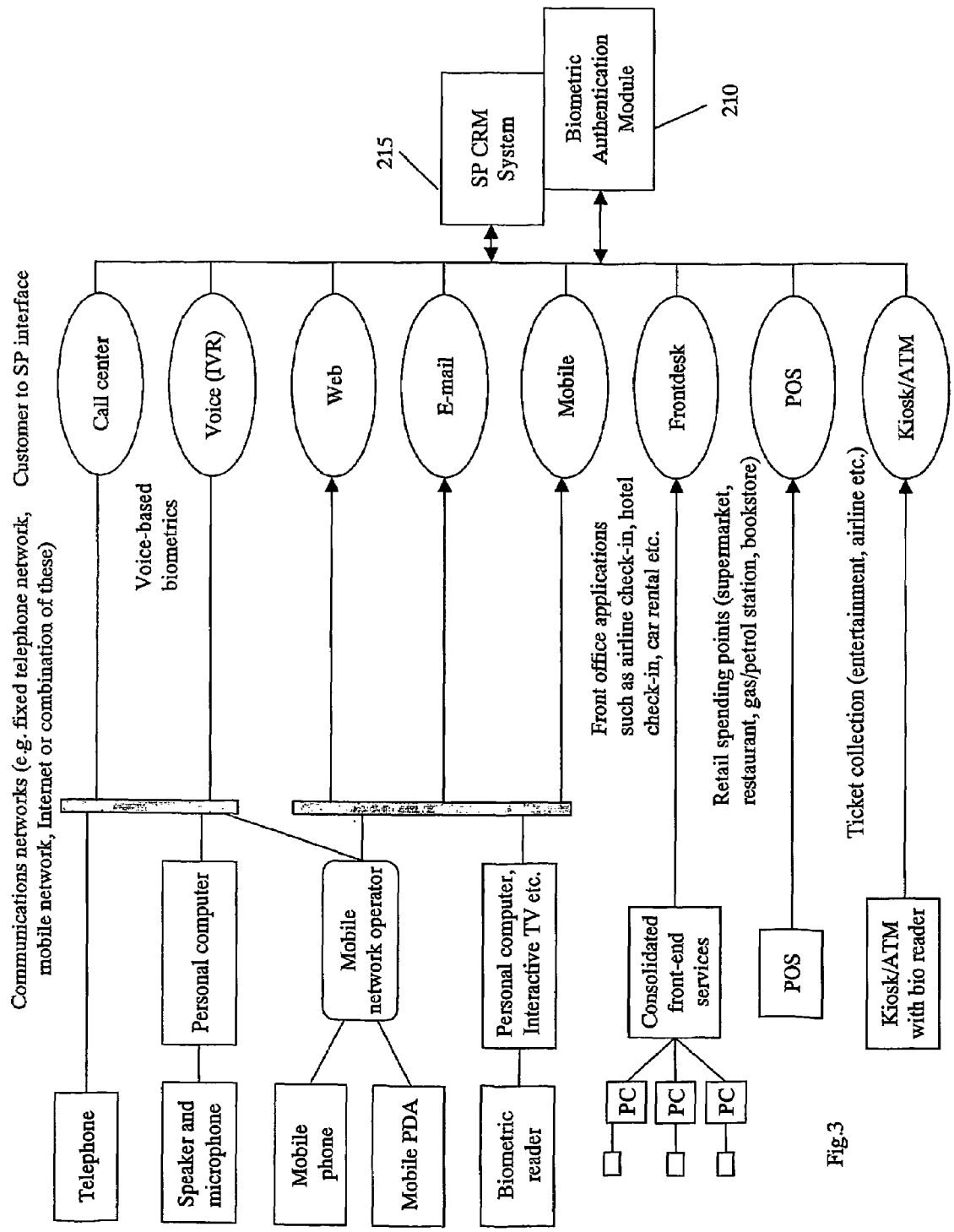
FIG. 3 is a diagram that details some of the multiple interfaces that a customer can use to interact with a SP and their CRM system.

As shown in FIG. 3 many different access mechanisms or channels of communication are possible to enable a user to interface with such a system.

The system 200 provides a centralised access point to a plurality of different datastores associated or defined for a specific user, each of the datastores being typically associated with the services or products that service provider offers.

By enabling a single access point for user access to a plurality of service providers, the present invention enables a more convenient and efficient manner for the information in one or more service providers accounts relating to one or more specific customers to be accessible and also to be updated. By the term central access point is meant the initial contact location to the network that is used by a user. This it will be appreciated can vary with access, in that a user may utilise any service provider with which they have an account or alternatively directly access the evault. Any access across the network will require authentication by the authentication engine. It will be appreciated that one or more of the servers may be adapted to allow for initial interaction between the user and that service provider, but relying on the ability for a subsequent authentication of the user.

This has specific application to the gathering and updating of customer information which traditionally has been performed manually by the an individual service provider (SP), and hence is a costly operation. It is in the customer's interest to ensure that the data held about them at an SP is accurate and up to date, as this will ensure that a service or product can be tailored or selected based on their profile. The invention provides a convenient and accessible method to allow customers to perform this task. Effectively, within the system of the present invention, CRM accounts are open and accessible to consumers. SPs will be compliant to applicable privacy regulations that require them to allow their customers to access, and to a certain extent change, data held about them.

The customer can view and update part of their CRM data held by a SP. For example, when a customer moves and changes his address, they can update this part of an SP's CRM data, either by directly interacting with the SP CRM system 215, or by indirectly pushing the information to the SP CRM system 215 from a central customer information repository, such as the electronic vault (e-vault) 205. Using the example previously described where the e-vault stored a generic dataset related to the customer, the system of the present invention enables a sharing or linking of fields in the e-vault to other equivalent fields in external service providers so as to enable the easy maintenance of relevant information in a plurality of data sets. The customer is authenticated to the SP using biometrics, either in isolation or alternatively in combination with the use of other traditional authentication tokens such as passwords, PINs or hardware tokens.

Cardless Loyalty Cards

The biometrically-enabled CRM system of the invention allows customer biometrics to replace the loyalty card, not only at one SP, but across multiple SPs. This hugely improves the level of convenience for the customer, as multiple cards no longer need to be managed. The customer presents their biometric to the system, such as by placing a finger on a biometric fingerprint reader, and this will link the transaction to the account associated with that customer. The same biometric can be used to identify the customer to a different account at another SP, eliminating the need to carry any physical tokens. Since only the customer is in possession of her biometric, the procedure authenticates her to her account.

We use the term "cardless loyalty card" to refer to a loyalty account to which the customer can be identified without an actual physical card. While the owner of such a cardless loyalty account can be authenticated using a biometric identifier alone, alternatively a soft token may be used for further security. For example, a customer might use their phone number or another memorable number of their choice to authenticate to the account. In the scenario where the access is not to decrement an account certain fields within a user specific datastore may be configured such that they may be updated without the provision of a biometric identifier. The initial configuration will require biometric authentication but subsequent updating may be allowable without. Security can be relaxed in this manner because the loyalty account is not used to make user payments, but is instead used to monitor and reward frequent customers. Therefore the consequence of compromise of a soft token is limited to someone else's account being credited.

If a customer loses, misplaces, or forgets to carry, one of their many traditional loyalty cards, for a specific SP transaction, then the CRM data about that transaction is potentially lost. Similarly, if the customer decides to make a payment transaction using cash rather than using an SP payment card, the user will be anonymous for CRM purposes. However, by using a biometric, which cannot be easily removed from the user, the number of completely anonymous transactions will be reduced. Hence CRM data will be collected more easily.

Automatic Customer Information Updates

The CRM system of the present invention enables organizations to collect customer, transaction, service, and demographic information from internal and external sources. This data can then be analysed and leveraged to effectively acquire, retain, and service valuable customers. Some information, such as a customer's home address, personal details, or payment card (e.g. credit card) details are universal across all SPs. In order to prevent the customer having to directly update such details with every SP, the data may be updated only once, at a central customer data repository. The centrally updated data is then automatically and securely sent to each SP that requires, and is authorized to receive, this customer data. The term "reverse CRM" is used to define this process whereby a consumer automatically updates the service and fulfillment providers, with whom he deals, with new details.

The system of the present invention provides for the interaction between the evault and the various service providers that are configured for interaction with the evault so as to enable an automatic updating of information from one datastore to that of another related datastore. For example, the system is adapted to enable the monitoring of any update of certain fields within the user's datastore and the evaluation of any action required on the basis of such updates. Such action may, for example be the updating of one or more datastores associated with the user but operated by external service providers. The system may be configured to effect this update based on an constant monitoring of relevant fields, upon specific request by the user to update the other datastores or alternatively upon request from a specific service provider for an updated dataset associated with the user. Furthermore it may be configured to enable the central evault to request information from a first service provider, either for central storage or for furnishing to other service providers.

By enabling an electronic vault (e-vault) to act as a "home" server, the network of the present invention provides a secure user data repository. The customer gains access to the e-vault using biometric authentication alone, or in combination with a soft token such as a password/PIN, or a hard token such as a smart card. The e-vault stores customer documents and data. Through the vault the user can be presented with a single view of all data, both that data held locally within the e-vault, and data distributed across many SPs. In turn, a complete view of a user's existing relationships with all organisations can be maintained.

In addition, preferences and permissions as to which SPs receive which information can be configured. SPs may also retrieve and verify specific customer data from the e-vault, provided the user has configured permission for this. The advantage to the user is since information may be updated centrally through the e-vault, it requires less information to keep all their relationships up to date.

The biometric authentication process, used to verify a customer to an SP for every transaction, can form part of the e-vault functionality, or can be a separate standalone entity. Alternatively the authentication engine can be a distributed entity with authentication information held locally, replicated or otherwise, at the SP site or one or more service providers.

Permission-Based Interaction

Figure 4:
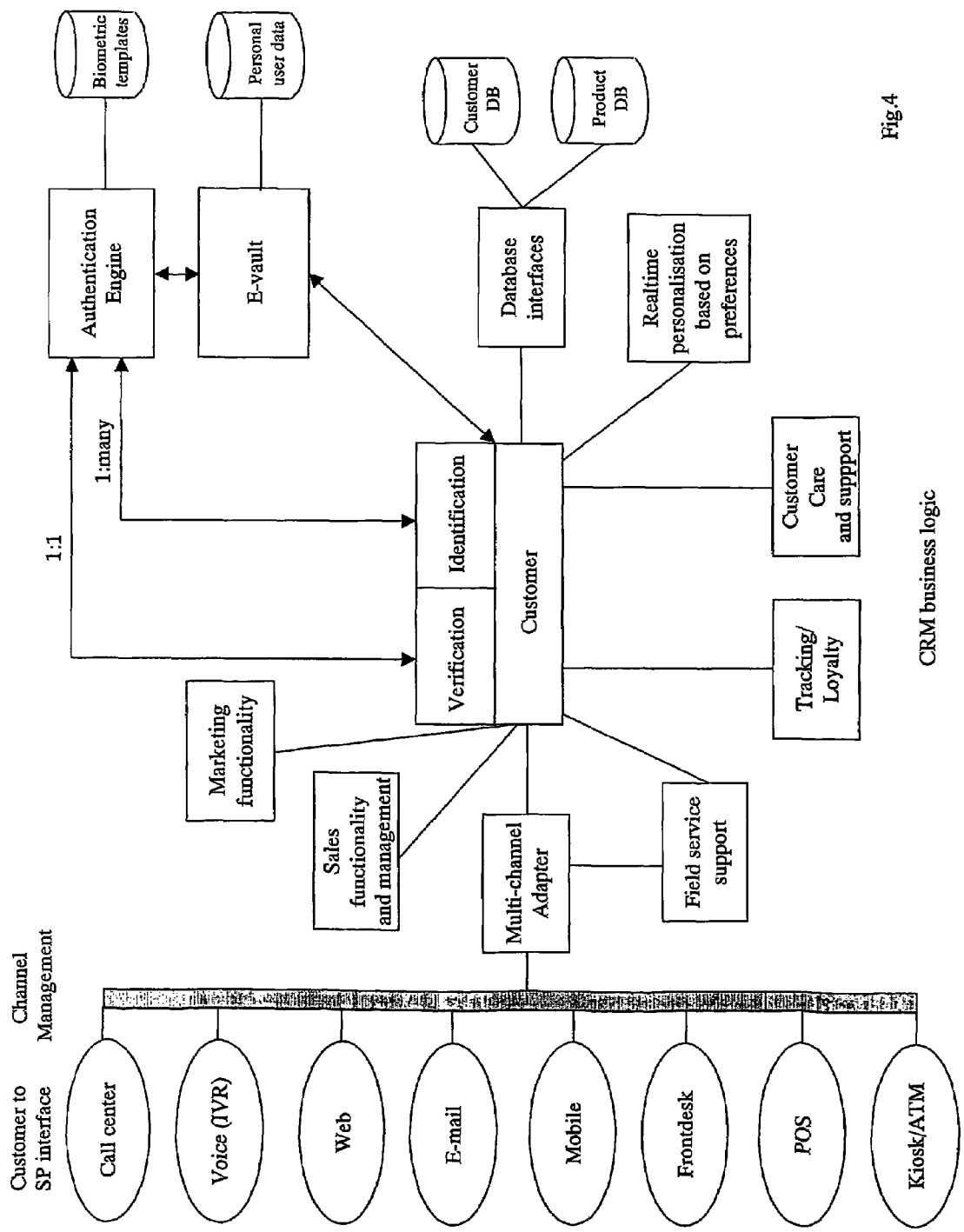
FIG. 4 is an architecture diagram for the biometrically-enabled CRM system.

As shown in FIG. 4, interaction of the customer with the CRM can be via a wide range of channels/bearers. The system allows permission based interaction of consumers with SPs. Consumers are able to configure a profile, which will set specific permission rules as to what actions can be performed on specific parts of their data and by whom. This permissions profile can be held and applied to data both at the e-vault, and at specific SP CRM systems. The permissions will control, for example, which user personal information may be automatically released to certain SPs, the fields that certain SPs are allowed to update, which information may be passed on by SPs to other SPs for marketing or other purposes, and for which actions user approval needs to be sought. In a preferred embodiment of the invention those portions of a user profile that have generic applicability across a plurality of servers and service providers will be stored centrally at the evault and distributed as required, whereas those configurations that are specific to an identified service provider will be stored at that service provider. Configurable opt-in permissions allow the customer to control their privacy.

The profile also allows preferences to be defined, allowing personalisation of CRM services on a per customer basis. Biometric verification or identification will confirm or release the customer identifier to the SP, which will then be used to obtain the preferences from the CRM data. For example, upon biometric identification at an airline check-in desk, the customer's seat and meal preferences on the aeroplane will be retrieved and presented on the operator's check-in terminal screen. At the same time the airline loyalty system will be updated with points awarded for the flight.

To the user, it is as if their biometric securely releases and controls all of their data across all SPs. The information is secure from unauthorized access or usage by the SP itself.

It will be appreciated that the system of the present invention enables biometric authentication by a user to a distributed network. In order to preserve the authenticity of the user biometric and prevent contamination or corruption, it is desirable that the presented biometric is not accessible to all entities of the distributed network. The present invention provides for this by enabling an authentication of a biometric at the authentication engine, through a channelled service provider without the service provider gaining access to the actual user presented biometric. The user presents himself for authentication at the service provider who then requests the user to provide a biometric sample for authentication against the template stored at the authentication engine. The provided biometric is encrypted and routed through the service provider to the authentication engine which returns to the service provider a confirmation that the user is authenticated or otherwise. The service provider does not have access to the keys required to decrypt the provided biometric and thus does not get access to the sample.

While the system allows customers to efficiently authenticate to the CRM system, it may also be used to allow SP employees, both internally and externally to authenticate to the same system. For example, a mobile sales force can interface into the home CRM system, and biometric authentication can be used to control which parts of the system they are allowed to access over the same interfaces as the customer.

The biometrically-enabled CRM system is complementary to traditional CRM. The approach has a person-centric architecture and view, which traditional CRM also strives to attain. The system allows a single unified view of the customer to be built across all departments, within an organization or indeed across multiple organisations. This is possible based on the unique customer account identifier returned from a biometric authentication. Different organizations may share common data available from the user's e-vault without compromising user privacy. The need for loyalty cards and other identification tokens has been replaced by using customer biometrics. This person-centric approach, with biometric verification and e-vault functionality, allows consumers to deal with both the public and private sectors through the same user-friendly, automated mechanism.

System Entities and Functionality

The main components and entities of the biometrically-enabled system are shown in FIG. 2. The function of each entity and the types of messages that can pass between these entities is now examined.

The Service Provider (SP), or fulfillment provider, is an entity that provides one or more services to a customer (user), and has a management system, the CRM system, for handling relationships with that customer. There can be many different possible communications channels between the user and the SP, and detailed examples are illustrated in FIG. 3, and discussed later. The CRM system maintains, organizes and analyses data about the customers. It will be appreciated that in many interactions between a user and the system of the present invention that the user is only concerned with interacting with a specific service provider. To authenticate the user, a network connection is required to forward the encrypted biometric supplied by the user to the authentication engine. Once the approval has been effected the network connection is no longer required and the interaction between the user and the specific service provider is a "stand-alone" type relationship.

The CRM system may be spread across multiple departments within a single organization, and may be geographically dispersed. For example, there may be a product sales department that holds information on users to whom products have been sold or who have expressed interest in a product. In addition, there could be a technical support department, for providing technical answers to customer queries, who also hold user data. However the scheme provides a single view of a customer, identified by their claimed identity and biometric.

A customer, or user, is an individual with unique biometric characteristics that may be used for identification/verification within the system.

Identification is where the customer only gives a biometric sample which is then compared with many other biometrics, known as a one-to-many match. With verification/authentication a claim is presented with the biometric to the authentication engine which allows it to be directly compared with a single biometric with which it should match, a process known as a one-to-one match.

Example biometric characteristics that may be used include, but are not limited to voice, fingerprint, iris, retina, hand geometry, palm, and face. The example embodiments described use fingerprint and voice biometrics.

The system is user-centric. The user interacts with SPs, as their customers, to perform any traditional transactions offered by that SP as part of their business. However, each transaction is preceded by a user biometric identification or authentication. In addition, the customer can request CRM data or update CRM data held by the SP. The user interacts with the SP through one of the multiple interfaces, shown in FIG. 3.

It will be appreciated from the above that regardless of the channel by which the user connects initially to the system of the present invention, that authentication is effected at the authentication engine. The authentication engine authenticates the service provider through whom the request is sent, using digital signatures, shared secrets, IP addressing, or other techniques known in the art. Associated with a user enrolment data held at the authentication engine, is a list of one or more service providers with whom that user has an account. For each service provider, the AE maintains an account identifier, which the SP uses to uniquely differentiate the user from others. Upon a successful authentication, the appropriate user account identifier, specific to the service provider through whom the request passed, is returned to that service provider.

The advantage of this is that a universal account identifier need not be used across all service providers, which would allow the service providers to collude to share data about that particular user, and hence reduce the user's privacy. Instead, a single individual may have many different account identifiers associated with them, one or more per service provider, and the service provider only knows the user by this SP-specific account identifier. The AE mechanism allows a single biometric identity to map to multiple SP identities, with the appropriate one being selected and returned to the requesting SP after a successful user authentication.

Customer Groups

While a user will typically represent themselves, such as in an airline loyalty scheme or for car rental purposes, they can equally well represent a group or company. Biometrics from multiple individuals can be used to authorize a transaction. For example, to make a high-value business purchase, biometric samples from two of the staff members in a company's purchasing department may be required. Each of the biometrics is authenticated by an external authentication engine so as to ensure that the individually presented biometrics cannot be compromised.

As with single-party profiles and permissions, similarly group profiles and permissions may be configured, both at individual SPs and at the e-vault. The group profile contains the members of the group, identified by claimed identities. Permissions as to what transactions each group member may perform, or the number of members with certain privileges which are needed to perform a specific transaction are detailed.

Many SPs who administer loyalty accounts, allow the balances of several such loyalty accounts to be combined. This has the advantage of allowing people to consolidate their points to make a group purchase. For example, a family might be able to redeem their loyalty points for an otherwise prohibitively expensive item for the family home. Such schemes are compatible with the biometrically-enabled CRM system. Each claimed identity will map to one or more accounts at an SP. These accounts can then be linked to a group account, which may be accessed by any one of the group members, upon successful authentication.

E-Vault for Aiding CRM

The e-vault is a central repository for holding user personal information. It can be configured to maintain any document or information that the user decides to place into it. The user is authenticated to the e-vault using biometric authentication, as with the SP. It will be appreciated that in direct communication between the user and the evault that a prior authentication of the user by means of biometric authentication at the authentication engine is required. However, if configured, a service provider may interact with the evault so as to obtain user specific information or otherwise, on the basis of traditional digital signatures or other methods as will be apparent to those skilled in the art. Following a successful verification, the user may view data, update data, deposit data, and set permissions within the e-vault.

The permissions control what user information may be released from the e-vault to a SP, or what information the SP may deposit into the user's e-vault. For example, a credit card company would be allowed to securely deposit a new credit card number into the user's payment information section within the vault. Similarly the user would allow that new credit card number to be securely distributed to all SPs who are paid monthly from the customer's credit card. Information may be released or accepted automatically or manually, as configured by the user. In addition, e-vault data can be used to build advanced features such as pre-qualification of users for certain products, such as application for credit.

While a user may view and update CRM data directly with the SP, it will also be possible to manipulate this information through the e-vault. In this way, updating information at the SP is transparent to the user, and a single update can be used to push new information to multiple SPs. For example, a change of address can be performed at the e-vault once, rather than at every SP with whom that customer has a relationship.

While an e-vault will typically be presented to the user as a logical single entity, the user may have data distributed over several independent inter-working e-vaults. For example, there might be a government e-vault with the user's government related documents and a physically separate e-vault for holding retail transaction data. At a macro level, different security requirements and trust levels might be associated with the data held in each.

Authentication Engine

The authentication engine (AE) verifies and identifies users on behalf of SPs and the e-vault. The AE is a logically separate entity from the e-vault. However they may be operated by the same entity if desired. The authentication service is provided using the unique biometric characteristics of an individual, or alternatively for migration purposes, using traditional means such as PINs, passwords, and hardware tokens. A biometric reader captures a biometric sample from the user, from which features are extracted to form a "biometric template" which is forwarded through the SP to the authentication engine. The template, and an optional claim, is used to identify or authenticate the user.

While the main purpose of the AE is to verify the identity of individuals it also verifies that the submitted template has been linked to the transaction message. In addition, it will verify that the SP and the entity that constructed the transaction message are in agreement, without needing to see the contents of that document. This can be used for many applications including the concept of "off-line signing". Where the user and the SP application with which they are interacting are not directly connected to the AE, or where such an "on-line" connection would be prohibitively inefficient or costly, transactions may proceed in such a manner that they can be verified later by the AE, without risk of manipulation or corruption. This is done by locking the transaction data to the biometric authentication data, in such a way that only the authentication engine can unlock it, and verify its authenticity and freshness. That is, a user can commit to a transaction, such as signing a document, while a connection to the AE is not present.

The biometric technology provides a reliable, convenient and secure method to confirm personal identity using something that is uniquely part of every user. For example, during airline-check-in, a biometric can be provided to identify the individual to the airline CRM system and reward them with loyalty points.

In order to use the biometric system the customer must be enrolled. Typically this will occur when they sign up for the e-vault. However it may also occur through a trusted SP. For example, an airline might be allowed to enroll an individual provided that they provide their passport. The initial enrolment can be re-used when registering for the first time with another SP, by submitting a biometric and the appropriate identity claim. When the user registers as a new customer with a SP, they will be verified through the authentication engine, using the previously enrolled templates.

The biometric matching processes are complex and dependant on the type of biometric being used, and the degree of confidence to be associated with the match. The enrolment process attempts to create the most accurate template possible from the biometric source. This gives subsequent verifications the greatest possible chance of achieving the correct result.

Multi-modal biometrics can be used within the system and allow multiple biometrics to be used together, such as voice and fingerprint. Due to having two or more biometrics from a customer, the probability of a false match occurring can be decreased.

Data Held within the System

The contents and purpose of the main data stores are now briefly summarized.

Biometric Template Database

User biometric template information, captured during enrolment, is stored encrypted at the authentication engine. An efficient symmetric key encryption algorithm, such as Rijndael, is typically used to do this. Associated with each user template set are the SPs with whom the individual has registered as a customer and optionally the services for which they have registered.

The individual is identified within the authentication engine by a claimed identity, which when combined with the biometric uniquely identifies the customer across all SPs. One or more unique customer account identifiers (Customer-_AC_ID) for each CRM SP are linked to the claimed identity. The claimed identity may take the form of a non-secret code such as a name, phone number, PIN, or other convenient alpha-numeric string.

For privacy purposes where the claimed identity is an account number, it may be blinded from the authentication engine. Methods to do this include the CRM SP maintaining a table that maps the user claim identity to the "blinded" claim identity used at the authentication engine. Alternatively, to prevent having to maintain such a table, the blinded claim identity may be derived directly from the user claim identity, by using a symmetric encryption algorithm with an SP secret key to encrypt the user claim identity. Similarly, a one-way hash function may be used to blind the claim identity, although since this cannot be reversed, it will require the SP to remember the original claim during the transaction period.

During verification, the claim is submitted, in order to identify which candidate template to perform a match against. If the claim is unique within the SP then it will map to a single template against which a match is performed. If no claim is presented, or the claim is not unique within the SP, then a one-to-few match is performed across some or all individuals registered with the requesting SP. The authentication engine and templates will be administered by a Trusted Third Party (TTP). However, the engine and templates for an SP may also be maintained locally.

Customer CRM Data

Each SP holds data about their customers, based on the customer account identifier. This account identifier is unique within the SP and is returned as part of the identification/verification of the customer claim identity. Since the authentication engine can provide unique identification of the customer across departments and databases within a single organization, all CRM data will be synchronized and linked to that customer account.

Typical CRM data held on each customer will include personal details, transaction history, products subscribed to, services used, preferences, and loyalty points amongst other things. Some of this CRM data will be obtained from the user e-vault while the remainder will be collected by the SP itself. Parts of the CRM data held at the SP will be viewable, by the customer either directly or through the e-vault. CRM data may be mirrored at both the SP and the e-vault for efficiency purposes.

Customer Personal Data

The e-vault is a central repository for user personal information. For example, it will hold their name, address, and other personal documents including their birth certificate, passport, educational qualifications, and marriage certificate. However, it is fully configurable and may hold any document or information that the user decides to place into it. Other example contents include mortgage, insurance, and vehicle documents, share certificates, and customer preferences for multiple services.

The e-vault also holds data, in the form of profiles and permissions, which controls data that is allowed to be shared between the e-vault and specific CRM SPs, and vice-versa. Profiles and permissions are highly configurable, although the level of transparency to the user can also be controlled. Within the configuration utility, SPs may be identified by name, grouped based on the service provided by them, or categorized depending on e-vault information required (such as payment card de ails). Data which may be released or accepted from SPs can also be identified by individual field, field functionality, common groups (such as name, address, phone and fax numbers), or SP configured groups. Transactions (such as SP read, SP write, SP create, SP delete etc.) may similarly be identified individually, and in common or SP-specified groups.

Transaction data may also be imported from certain SPs, and either be passed on directly, or after refinement, to other SPs according to the user's preferences. One application of this is permission-based cross-marketing.

In terms of data sharing, some data might be defined as public and require only weak authentication by the SP requesting access to it, while other more private parts of a user's data, might require strong authentication. It will be appreciated that the evault stores system specific information and configurations concerning which service providers a specific user has enrolled with and the information that may be shared between these individual service providers.

Identity Claims and SP Contexts

When a customer interacts with a CRM SP they may be required to present their identity claim or for convenience, a partial identity claim. If no claim is provided then identification, based on the template and the SP context must occur. The SP context will determine whether the SP wants all of its customers to be searched against the template for a potential match or whether only a subgroup should be searched. Subgroups are defined using a service identifier to which the SP has supplied a list of customers subscribed to this service. Similarly if customers are allowed to share claimed identities, such as may occur when allowing only 4 digit PINs as the claim, a one-to-few identification will occur between all SP customers who share that claim. Since they do not share the same biometrics it will be possible to identify them.

Privacy

The system is privacy enhancing, despite using the same biometric across multiple independent systems. The customer will select a claimed identity, which they will use to identify themselves within the system. Associated with each SP with whom the customer has registered will be a unique SP-chosen customer account identifier for that customer's account. An authentication request may use either the claimed identity or the account identifier. With some SPs both these values will be the same. If it is not desirable to share knowledge of this account identifier, for privacy reasons, with the authentication engine, then it can be blinded during authentication requests, as described earlier.

The customer biometric template is used to identify or verify the customer to the CRM SP. Therefore, while it is passing across any network, it is protected from eavesdroppers, using encryption. By also encrypting the identity claim, network eavesdroppers cannot see who is performing the transaction, and therefore this information is kept private from outsiders.

An individual may have multiple claimed identities if they so desire, either across different SPs, or within the same single SP. Each different claimed identity will appear as a different person, thereby protecting the customer's privacy. However if the same individual enrolls with two different identities at the same SP for the same service, then this will cause a "biometric collision" during identification. In such a case, identification alone will not be possible, and authentication with the claimed identity must be used instead.

A customer can use an already enrolled claim identity to register with a new SP. Typically, users will already be enrolled with an e-vault, and this e-vault claim identity can be re-used to register with each new SP. Since the claim identity itself need not be unique, in that it could be a common name, SPs are prevented from linking users across independent SP databases using this information alone.

Another alternative is to issue a temporary blinded registration identity from the e-vault, which allows enrolment to be re-used without revealing the actual e-vault claimed identity. Alternatively for each new registration the customer can perform a new enrolment at the SP.

System Transactions

CRM System Interfaces

A customer can interact with the SP through many possible interfaces, as illustrated in FIGS. 3 and 4. The channel interfaces include, but are not limited to, access through a call center, automatic voice recognition system, Web interface, e-mail, mobile, frontdesk, point-of-sale, and kiosk/ATM. A voice communications device, such as a traditional telephone, a mobile phone, or a PC with voice telephony software (e.g. voice over IP) may be used to access the call center or automatic voice recognition system. In both cases, authentication will occur using the customer's voice. For example, they can be asked to repeat a specific phrase or answer a specific question, in a challenge-response scenario.

Internet interfaces such as the Web and e-mail may be used to access the CRM system from any Internet device, including Internet-enabled mobile devices. With frontdesk applications, such as an airline check-in desk, car rental desk, or hotel check-in terminal, the customer interacts with the SP through SP-operated equipment. Point-of-sale equipment, such as might be used in a supermarket, restaurant, gas/petrol station, or bookstore, can be used to effect payments and gather loyalty points using a biometric. A biometrically-enabled kiosk or ATM is a self-service interface for SP interactions, which can be used, for example, for entertainment or airline ticket collection.

The biometric CRM system as used for cardless loyalty account credits, may also be used to make card payments. Upon successful biometric identification, instead of crediting a loyalty account, a monetary account is debited.

Regardless of the interface used with the SP, the principles remain the same; a biometric authentication or identification of the customer takes place, after which one or more SP transactions, customer CRM data enquiries, or customer CRM data updates, are allowed to take place. Similar channels may be used to communicate with the e-vault.

User-SP Interaction

The steps involved in transactions between the user and a CRM SP, and the required message flows and contents are now described.

Typical SP transactions might include a purchase transaction, customer support, loyalty points transaction (cardless loyalty card), or a sales call. Authentication takes place using a biometric, possibly multi-modal, and/or a soft token such as a password. The authentication engine returns an indication as to whether the biometric matched for the supplied claim if authentication was requested. If identification was requested, and was successful, then a customer account identifier, unique to the SP will be returned. As a result of the transaction, customer CRM data will be updated.

A request to get customer CRM data will retrieve the selected fields from the customer information held in the SP CRM database. A request to update customer CRM data may only be performed on specific fields, as specified by the SP. However, by encouraging customers to update as many fields as possible, either directly or through the e-vault, new information can be quickly and accurately gathered about that customer.

All transactions need not occur in real-time, in the sense that the SP's central CRM system need not be contacted on-line during the transaction. For example, if biometric authentication is used during a cardless loyalty transaction, as long as a good-quality biometric template is captured along with the identity claim, the biometric verification and CRM transaction may be performed in batch at the end of the day.

Interaction Between SP and E-Vault

Information can flow from the e-vault to the SP and vice-versa. Each interaction is now examined.

The e-vault will send newly updated information to the SP. The e-vault is administered by a trusted third party (TTP) entity, and the source/validity of this data will have been authenticated. For example, the user will be authenticated before they are allowed to update their home address in the e-vault. Similarly a payment card company will be authenticated before they are allowed to deposit a new payment card number into a user's e-vault. As described above the information that can be released to specific SPs is configurable at the e-vault. In response to these preferences the e-vault may automatically update information at multiple SPs.

The e-vault may also request specific information from the SP on behalf of the user. The e-vault will biometrically, or otherwise, authenticate the user through the authentication engine, while the e-vault will authenticate to the SP using a public-key digital signature. The SP authentication need not involve the authentication engine. Effectively the e-vault data is distributed across many SPs.

The SP may also send new or updated customer data to the e-vault. This request to populate the e-vault is handled by limiting the fields that can be submitted, and will require user approval (automatic or manual) before accepting the data. An example, such as that shown in FIG. 7, is where a payment card company submits a new credit card number to the e-vault, so that it may be automatically pushed out to other SPs requiring the information.

The SP may also request customer data from the e-vault, on the customer's behalf. For example, when a customer is signing up with a new SP, and they may automatically want some of their personal details to be pulled from the e-vault and given to that SP for administrative purposes. However the SP is not a TTP like the e-vault. Therefore it is not just enough for the SP to authenticate to the e-vault, for such a request. The e-vault needs some assurance that the user has authorized this request. Therefore a customer biometric template will be acquired and securely forwarded to the e-vault, as detailed in the next section, as part of this request. In essence a biometric signature is generated, which includes the biometric template encrypted with the vault public key.

Alternatively the user request can be redirected to the e-vault, where authentication takes place, and the user pushes information to the SP, before being redirected back to the SP.

Inter-SP Interaction

It is also possible for SPs to directly share CRM information between each other, as an alternative to sharing information indirectly through the e-vault. For example, with a customer's consent, when the customer buys membership to a gymnasium, a discount coupon for sports clothes from a nearby sports shop could be presented to that customer. Such discount coupons may be software based, and stored either within the sports shop CRM system, or the e-vault. When the customer later authenticates to the SP while paying for the sports gear, the reduction is automatically made from their bill, based on the retrieved CRM information. This cross-marketing can be beneficial to all parties, and will form a key component of next-generation CRM.

Customers can use the same claimed identity, such as their name or initials across service providers. However, because this customer claimed identity need not be unique, it cannot be used to link the customers across SPs. Upon identification the authentication engine returns the unique customer account identifier for the SP requesting the service. To share or link information the two SPs must know that two different account identifiers, one at each SP, belong to the same customer. The user may directly share the account identifiers across SPs, or may allow this to be performed through the authentication engine.

The CRM data, viewable by the customer, will contain details about those entities with whom that data has been shared. This can be configured by the user and specific permissions set, in accordance with privacy legislation. Permission profiles can also be downloaded from the user's e-vault to SPs. Since different SPs may use CRM data for different purposes, there is also a method of indicating for what purposes the data may be used. In order to prevent any possible identity linking across service providers, an individual can use different claimed identities at each SR Transaction Message Flows The main messages that are exchanged between entities within the system are now examined. A secure application protocol is constructed in order to provide integrity, confidentiality and non-repudiation.

Before any transaction can take place between the customer and CRM system, that customer must be securely authenticated or identified. The first message exchanged will therefore always contain at least one biometric template. Transaction data, specific to the SP, may also be included. If verification is to occur, an identity claim, is also present.

It will be appreciated that a plurality of templates may be stored or submitted at authentication for a specific user, the templates varying in either the biometric sample type that was used to create that template or offering different templates for the same sample type. The provision of multiple templates that can then be matched against presented claims enables the system to utilise multi-modal authentication means and also if a specific template becomes corrupted, that an alternative is available.

Notation

The notation $PK_X$ and $SK_X$ are used to represent an entity X's public and private keys respectively, using a public key algorithm. $\{M\}PK_X$ is used to represent encryption of a message M using X's public key, while $\{M\}SK_X$ is used to represent encryption using X's private key. Encryption with a private key is assumed to produce a digital signature, such as with the RSA algorithm. However any public-key cryptosystem, capable of providing digital signatures may be used. In the actual implementation, for efficiency purposes, a hash of the message is signed, rather than the full message, to produce the digital signature, although this is not shown here. The notation $H(X)$ is used to mean the application of a one-way hash function to the data X, to produce a fixed length hash value.

Message Security for Identification and Authentication (Verification)

During authentication or identification a biometric template must pass through the SP systems. While this must be protected from network eavesdroppers, it is also desirable to hide it from the SP systems where possible, to prevent malicious SP employees from abusing it. For this reason the template is encrypted with the public key of the authentication engine, as near to the biometric reader as possible:

Encrypted_template=$\{template, nonce\}PK_{AE}$

It is possible to perform the encryption directly on some biometric reader devices while, in cases where this is not possible, it will be encrypted on an attached PC, or other processing device. A random value or timestamp, termed a nonce, is used to guarantee freshness of the message and to prevent replay.

The encrypted template is signed by the SP application, before submitting it to the authentication engine. This proves that the request originated from the SP, and provides a non-repudiable audit log. The requests for identification and authentication are given respectively:

SP->AE: ident_req=$\{\{template, nonce\}PK_{AE}, service\_context\}SK_{SP}$.

SP->AE: auth_req=$\{\{template, claim, nonce\}PK_{AE}, claim, service\_context\}SK_{SP}$ The service context allows the SP to provide an optional service identifier to reduce the number of registered claimed identities at that SP that must be searched. A secure tunnel will also be set up for all network traffic between the SP and the AE. This prevents an eavesdropper obtaining the claim or service context. IPSec or the Secure Sockets Layer (SSL/TLS) can be used to provide this. FIG. 5 shows the message flows that take place when identifying a CRM customer at a SP.

A signed response is returned in real-time:

AE->SP: ident_response={customer_AC_ID, reason, H(ident_request)}$SK_{AE}$

AE->SP: auth_response={yes/no, customer_AC_ID, reason, H(auth_request)}$SK_{AE}$ In the case of an identification request, if a match is found within the specified context, then the customer account identifier (customer_AC_ID) for that match, unique to the SP, is returned. With authentication a success indication is returned, along with the customer_AC_ID where the claim was not unique. While the customer can use their unique customer_AC_ID during authentication, it is more convenient for them to use an easier-to-remember claim identity.

If present, the reason field specifies why the requested service failed. In order to link the response to the initial request, a hash of the original request is included. In essence, this just acts as a unique transaction identifier, and could be replaced by a transaction number in both the request and the response.

The identification/authentication message may be included as part of a larger CRM transaction with the SP. For example, it might be included in a loyalty card transaction. The biometric used can be either fingerprint or voice, depending on the interface used in FIG. 3. However there is no reason why other biometric types could not be incorporated into the same protocol. With a voice biometric, a sample is automatically captured at the call center and features extracted to form a template. The voice template will be verified, with a claim, through the authentication engine.

After a successful authentication the CRM data is retrieved from the SP's CRM system using the customer account identifier. This CRM data is then returned to the SP employee responsible for dealing with the call. A customer's preferences and transaction history are then used to launch data screens and suggest actions at the employee interaction terminal. In addition, it is possible to prioritise the user's position in the calling queue, after authentication, based on information held in the CRM file. This prevents calls from important customers being queued behind lower priority calls.

Linking Templates to a Transaction for On-Line/Offline Scenarios (Biometric Signatures)

In many of the channels illustrated in FIGS. 3 to 7, the customer is remote to the central SP CRM system. The customer may contact the SP front-end over an open network. The SP front-end device may also be physically removed from the central SP CRM system, and connect to it over a network (private or open). In each case it is desirable to link the transaction message, M, to the submitted template, to ensure that a network attacker cannot change the context of either. In addition, the actual transaction details must not be revealed to the authentication engine for privacy reasons.

Typically there will be multiple frontdesk applications or point-of-sale terminals connected remotely to a single central SP CRM system. Transactions can be performed at these locations either on-line in real-time, or in a batch at the end of the day. For example, loyalty transaction requests may be accumulated throughout the day, and processed off-line at night. In both cases, the application protocol described here may be used.

Similarly, in several of the interfaces shown in FIG. 3, the user is remote to the SP, but has access to a local device with processing power. For example, this could be a mobile phone, PC, PDA or other device. The template sample is linked to the transaction at the customer device, in order to prevent tampering. The same procedure is used for remote off-line methods such as e-mail, where the authentication request is included with the e-mail constructed by the user.

When the biometric sample is collected the local biometric application which converts the raw image data, in the case of a fingerprint, into a template needs to ensure that the sample collected is of a certain quality. This is especially important if the transaction occurs off-line. The template is collected and stored with the transaction message. An example transaction might be to credit a loyalty account by 400 points, as a result of checking in for a business class flight.

In order to link the CRM transaction message to the biometric authentication/identification request, a hash of that message, H(M), is included:

CRM_transaction=M

Linked_template={template, H(M), nonce}$PK_{AE}$

Linked_claim_template={template, claim, H(M), nonce}$PK_{AE}$

It will be appreciated that the template represented above could be one or more actual templates or indeed a consolidated template.

The message M represents the CRM transaction to be carried out with the SP. The nonce value guarantees freshness and prevents replay of the public-key encrypted message to AE. The nonce can be generated by the user or constructed by the AE and sent to the user. The difference between identification and authentication is the presence of a customer identity claim.

FIG. 6 shows the message flows for an authentication of a remote CRM customer, where the transaction message is linked to the authentication request by the customer. These messages are constructed locally with the customer, on their own device, or on the SP front-end application. The message M and the optional claim for authentication, are also sent along with the linked template to the central SP CRM system.

The SP replaces the transaction message M, with a hash of the message, before signing the whole construction, and sending it to the authentication engine:

SP->AE: ident_link_req={linked_template, H(M), service_context}$SK_{SP}$

SP->AE: auth_link_req={linked_claim_template, claim, H(M), service_context}$SK_{SP}$ The request may be sent to the AE immediately or off-line in batch. The SP signature shows that the request originated from the SP, and can be used to provide non-repudiable audit logs. Presence of the message hash in the SP created part of the message, and in the customer-created part of the message show agreement between those two parties, without revealing the message contents.

The SP cannot create the customer's part of the message unless they have maliciously obtained and stored a copy of the customer's template. By only including a hash of the transaction message rather than the full message itself, privacy is protected as the authentication engine cannot see the transaction details, but instead only knows that both parties are in agreement. This has further application in a secure signing of documents in that the document details can be restricted but the actual document can be transferred between parties.

The AE will respond with the unique customer account identifier as represented at that SP:

AE->SP: ident_link_res={customer_AC_ID, reason, H(ident_link_req)}$SK_{AE}$

AE->SP: auth_link_res={yes/no, customer_AC_ID, reason, H(auth_link_req)}$SK_{AE}$ The customer account identity could be a loyalty account identifier, a name, or other unique identifier within the 1:few service context group searched by the SP. The hash of the identification request is used to link the response to the request.

With certain transactions, the AE may return additional information, embedded in the above response messages. Typically the transaction data submitted by the user, that was unreadable by the SP, can be returned after the user has been authenticated, and the user and SP are shown to be in agreement over the transaction details.

This transaction data may be modified or extended in one or more ways by the AE, or a third party in co-operation with the AE. For example, with an off-line signature request, where the user submitted a hash of a document to be signed, the user signature applied to that document will be returned. Such a signature can be generated by securely applying a user signing key, held by the AE or other third party co-operating with the AE, to the submitted document hash, after successfully verifying the user. In this case the response might take the form:

AE->SP: auth_link_res={yes/no, customer_AC_ID, user_signature, reason, H(auth_link_req)}$SK_{AE}$ Where user signature is an encryption of a document hash, submitted in the authentication request, with a user private key:

User_signature={H(Document)}$SK_{User}$

All messages are sent across a secure encrypted channel to the destination. IPSec or SSL/TLS can be used to provide such an encrypted tunnel.

Alternatively if no secure transport is available the messages may be encrypted with the receiver's public key.

Preventing Template Abuse for Remote Customer Transactions

The identification/authentication protocols rely to some degree on the secrecy of the template. If the SP, or any other attacker, knows the template and optionally the claim, then they can construct the message that appears to come from the customer. However, since the SP is attempting to authenticate the customer, it is not in their interest to pretend to be that customer. This is because the system does not provide a non-repudiable customer digital signature, but only a customer authentication.

To prevent an attack by an entity that has obtained the customer template and claim, a secret can be used, shared between the customer and the AE. The protocol is updated by including a secret in the customer-originated message:

CRM_transaction=M

Linked_template_secret={template, claim, H(M), nonce, secret}$PK_{AE}$

Cust->SP: cust_link_req={linked_template_secret, claim, M}

The SP signs and forwards the encrypted template, claim, and secret to the authentication engine:

SP->AE: auth_link_req={linked_template_secret, claim, H(M)}$SK_{SP}$

The secret prevents the SP or an attacker from falsely constructing the customer message. For convenience, the secret can be something easy to remember for the customer, such as a passphrase, a mother's maiden name, or a date of birth and phone number.

However, a dictionary attack, where an attacker tries all possible values for a secret in order to reveal it, is possible on the customer secret, if the other fields are known. Therefore the actual customer secret is replaced with the following material in the message:

H(secret, H(M))

The hash of the CRM message, H(M), which will be different for each request, forms a random salt which prevents a dictionary attack. Typically identification will not be performed for a remote Internet user as it opens up the system more to brute-force guessing attacks.

Interaction Protocol Between SP and E-Vault

As outlined in an earlier section there are four possible interactions between an SP CRM system and the e-vault; the e-vault can send new information to the SP or request information from it, and the SP can send new information to the e-vault or request data from it on behalf of a customer. The protocols for each are now examined in turn.

As before, the application messages will be exchanged over a secure transport or network protocol such as SSL/TLS or IPSec, which provides confidentiality. The purpose of the application protocol is to provide non-repudiation, and if this is not required SSL or IPSec alone could be used, without need for digital signatures.

User approved information can be passed from their e-vault to specific SPs. The information is signed by the e-vault for non-repudiation and a nonce included for freshness:

E-vault->SP: vault_send_info_req={customer_AC_ID, info, nonce}$SK_{E\text{-}vault}$ The SP CRM will acknowledge receipt with a signed hash of the message:

SP->E-vault: vault_send_info_res={result, H(vault_send_info_req)}$SK_{SP}$

The e-vault request for specific information from the CRM system, on behalf of the user, takes a similar form as the previous request, except that the info field is replaced with an info_request field:

E-vault->SP: vault_get_info_req={customer_AC_ID, info_request, nonce}$SK_{E\text{-}vault}$ The reply contains the requested customer information, signed by the SP:

SP->E-vault: vault_get_info_res={customer_AC_ID, info, nonce}$SK_{SP}$

The SP can also send new information to the e-vault and request information from it. There are two ways to handle permissions for these requests. With the first option the permissions are configured at the e-vault by the customer before the SP initiates the request. Alternatively, proof of the user's consent can be included in the SP request. This proof takes the form of a customer biometric, encrypted with the authentication engine's public key:

SP->E-vault: SP_send_info_req={customer_AC_ID, info, service_context, {template, claim, nonce}$PK_{AE}$}$SK_{SP}$ The e-vault will forward the encrypted template to the authentication engine for verification. The nonce will prevent the SP, or any other party, successfully replaying old templates. The e-vault will acknowledge receipt of the information by signing a hash of the original request. The new information for the SP can be placed directly into the user's e-vault, or can be held for manual approval by the user. Whether information is automatically accepted or not is configurable on a per field and per SP basis.

Finally the SP can request data from the e-vault on the customer's behalf, such as name and address, and payment card information, perhaps during an initial registration. The request message is similar to the previous request, except that the new information field is replaced with an information request field:

SP->E-vault: SP_get_info_req: {Customer_AC_ID, info_request, {Template, claim, nonce}$PK_{AE}$}$Sig_{SP}$ The reply contains the requested information, or a refusal reason, signed by the e-vault.

FIG. 7 shows the message flows for the automatic update of a customer's payment card details, performed through the e-vault. SP1 is a payment card issuer, who securely pushes a new payment card number into the customer's e-vault. The e-vault will automatically accept this, if configured to do so by the user, or alternatively will hold it for the customer's manual approval. Following this, the payment card number is sent by the e-vault to SP2, who the customer has approved to receive any updated payment card details.

Inter-SP Messages

Messages which are passed between independent SPs, to exchange customer data, are signed for non-repudiation purposes. Indirect customer authentication where a customer encrypted template is passed from one SP to another, and on to the authentication engine is also possible. The same protocol can be used as when an SP requests e-vault information on behalf of the user.

Alternatively, the customer may be re-directed to the second SP, to establish a new communications channel with them, in order to perform a specific transaction, perhaps in response to a cross-marketing offer.

The following are important aspects of privacy in interactions.

1. Digital signatures for non-repudiation of message sender
2. Public-key encryption of template to minimize accessibility by SP or others
3. H(request) used to allow response to be linked to original request
4. H(transaction_message) linked to template, to minimize ability of SP to tamper with transaction contents
5. A once-off secret, derivable from a password, is linked to the template to minimize abuse of stolen templates
6. A claim and unique customer account identifier is associated with a user's template for each SP to whom they are subscribed In more detail, a symmetric (public-key) cryptography is applied to the application protocol in order to provide integrity, confidentiality and non-repudiation. Standard secure transport protocols such as SSL and IPSec are used to encrypt all communications at the transport or network layer respectively. This prevents network eavesdroppers from seeing any of the communications.

Digital Signatures:

A digital signature, {X}$SK_{SP1}$, is used to show that the message X came from SP1 and this can be proved to an independent third party (non-repudiation). A nonce is a random value or timestamp. A nonce is included to guarantee freshness of the message and to prevent replay. The receiver may generate the nonce and give it to the sender to include in the message or the sender may generate the nonce themselves.

Public-Key Encryption of Template:

Once a template is generated from a biometric reading it is encrypted with the public key of the authentication engine (AE). The AE's private key is needed to decrypt this. Therefore the only entity that can now decrypt this value, and hence access the template, is the AE. This prevents even the SP, and employees on the SP network from gaining access to the template.

Linking Response to Request:

In the response to a request message, a hash of the request message is included. The hash acts as a unique identifier, or transaction identifier, of the request message. It is used by the response request to identify to which request the response corresponds. For example, H(auth_request), is included in auth_response to link that response to a specific auth_request.

Linking Transaction to Template:

If a user performs a transaction and is authenticated only using their biometric, then there needs to be a way to link that authentication with the transaction message. Otherwise the transaction message may be altered by a malicious SP or by an attacker. For example, if the user is making a purchase for $1, then there is nothing to prevent an attacker changing the amount field to another value such as $1,000.

A hash of the transaction message M is a unique identifier of that transaction. However, while the hash value identifies the transaction, it does not reveal the details of that transaction. H(M) and the template are encrypted with the AE's public key—this prevents anyone else from being able to decrypt it or change its contents. In essence it links the transaction to the submitted template.

However the SP needs to be assured that the transaction message they have been presented with, (which is not linked to the template) matches the transaction that was linked to the template. Therefore the SP generates a hash of their version of the transaction message and sends it to the AE. If the SP's copy is the same as that linked to the template then both hash values will be equal.

The AE, who has access to both hashes, performs this comparison and returns the result. The AE has been able to check that both the user and the SP agree on what the transaction is, without needing to know what the details or amounts involved are.

If one of the transaction messages is changed, then it will generate a different hash value that will not match the other one, showing that the user and SP are not in agreement about the transaction.

Secret to Prevent Abuse of Stolen Templates:

Some transactions will be performed remotely over the Internet. The user software will collect the template and construct the appropriate application message. However if a copy of the user template is ever obtained then it would be possible for an attacker to submit that template remotely and impersonate the user. Since templates are derived from fingerprints then such an attack may be feasible.

To prevent this attack the AE issues the user with a secret password. By including this with remote requests the AE can be assured that it is the user rather than an attacker with a stolen template.

However if an attacker obtains a copy of the encrypted message they can attempt to guess the user's password by trying all possible passwords (a dictionary attack). The attacker guesses a password, encrypts it with the template and other data and compares it to the copy of the encrypted message. If they match then he has guessed the correct password.

To prevent this dictionary attack a different longer password is used each time. This "temporary password" is derived by hashing the original password concatenated with a unique message identifier (in this case, a hash of the message).

Templates and Claims:

At a conceptual level each user will have at least one enrolled template, stored at the AE. For each SP that the user subscribes to a claim and/or a customer account identifier will be associated with that template and SP:

User Template A

SP1, Claim1, Cust_AC_ID1

SP2, Claim2, Cust_AC_ID2

SP3, Claim2, Cust_AC_ID3

The customer account ID is unique within a specific SP service, while the claim need not be. For convenience the user may re-use the same claim and multiple SPs, as in the case with SP1 and SP2 above. Alternatively, they may wish to use different claims, perhaps for privacy purposes.

1.1 Implementation Architecture

The platform for the biometrically-enabled CRM system is typically implemented using an architecture such as the Java 2 Architecture, from Sun Microsystems. However as will be appreciated by those skilled in the art, there is no reason, why other implementation languages, platforms, and methods, could not be alternatively used to implement the system. The system can be integrated with existing legacy CRM solutions, since the invention provides authentication and identification functionality over multiple channels to uniquely identify customers across existing CRM processes.

FIG. 4 shows how traditional components of a CRM system interact with the biometrically-enabled CRM scheme. The traditional CRM components include, but are not limited to marketing functionality, sales functionality and management, real-time personalisation, tracking/loyalty, customer care and support, and field service support. There are interfaces from the multiple input channels, and with the core authentication engine, e-vault, and CRM databases.

Call Center and Voice (IVR)

The simplest, and most ubiquitous, communications channel with the SP, is the traditional telephone. Interactive voice response (IVR), speech recognition, and speaker recognition are used, alongside the traditional call center functions. Customer authentication can be provided by interactively asking for a claim, using speech recognition to interpret this, and then performing speaker recognition on the voice sample. To prevent an attack using a digital voice recording, a challenge-response protocol may be used, where the customer is asked to repeat a certain random sequence of numbers or phrase. The speaker recognition functions are handled by the authentication engine.

After authentication or identification, speech recognition may be used to translate customer requests into electronic requests, which are then processed by the SP CRM system. Electronic responses from the CRM system, are then translated into computer-generated speech and played to the user over the telephone. Example requests include retrieval of customer CRM data, and updating of this data. Alternatively, with more complex CRM requests, an SP employee may handle the request through a call center. Voice biometric authentication is more convenient, easier, and secure for the customer than using traditional telephone Dual Tone Multi-Frequency (DTMF) signalling tones to communicate PINs and traverse menus.

Both fixed line and mobile telephony may be used to access the voice channels. In addition to traditional circuit switched telephony, packet switched telephony, such as voice-over-IP (VoIP) may be used to access the voice-based biometric CRM front-end. A microphone and speaker connected to a PC with VoIP software, or any device supporting VoIP may be used by the customer to access this channel. The Java Telephony API can be used to provide call control functions for this interface.

Web Interface

The customer uses a standard Web browser to communicate through the Web channel. A downloadable java applet, or alternatively a plug-in module, is used to provide the extra functionality required by the biometrically-enabled CRM protocols. Web browsers have been implemented on a variety of platforms including PCs, PDAs, and mobile phones. Any of these can be used, provided a biometric reader is also attached or embedded in the device. Where voice biometrics are used, this can be a simple microphone, whereas with fingerprint it will be a fingerprint scanner. The integrity and confidentiality of all communications, between the customer and the CRM system, are protected by using the Secure Sockets Layer (SSL), which is a standard component of the browser software. The SP CRM will be authenticated to the customer, as part of the SSL set-up protocol, using an SP SSL digital certificate.

Although described with reference to SSL it will be appreciated that alternative protocols such as IPSec may be used.

Application Messages

All customer requests, not based on voice, originating from a remote device, take the same overall form at the application layer. As shown in FIG. 3, examples of such devices include a PC, interactive television, or mobile PDA. Each customer request to the CRM system may be formulated as an XML document, and follows the secure application protocol specified earlier. Each encrypted block or digital signature, forms a different sub-element of the overall XML message. For example, the encrypted biometric template forms one block component. The World Wide Web Consortium (W3C) XML digital signature specification and XML encryption recommendation are followed in a preferred implementation.

The type and content of data exchanged within the system will be highly variable from one provider to another. In some cases, as with payment card numbers, it will be necessary to keep the data highly secure and confidential. In other scenarios such as when exchanging user preferences, or a small number of points to a loyalty account, the security may be relaxed.

This can be done by using lightweight cryptography instead of full digital signatures and public-key encryption. Long-lived shared secret between an SP and e-vault may be used. Other alternative mechanisms such as IP filtering may also be used. However, the cost to subvert a data exchange should always be kept higher than the transaction itself. The benefit of relaxed security will be better performance for high-volume servers.

It will be appreciated that the present invention provides numerous advantages over that of the prior art. The following summarises some of the advantages and features of the invention, although it will be appreciated that it is not intended to limit the application to any one set of advantages or features.

Single Unified View of the Customer

The biometrically-enabled CRM system provides a mechanism to securely and conveniently obtain a single unified view of a customer within an organization. The customer can be identified or authenticated to the system using finger or voice biometrics, or a combination of both (multi-modal), through an authentication engine. Traditional mechanisms such as PINs, passwords, public/private keys, and hardware tokens may also be used with the authentication engine, in combination with biometrics or independently, to securely authenticate the customer. By using biometrics the customer can be uniquely recognized in all transactions, and updates such as address changes and payment preferences may be automatically retrieved.

Cardless Loyalty Card

The system provides biometric access to loyalty accounts, thereby removing the need to carry and use physical loyalty cards. Multiple physical loyalty cards have been replaced by using customer biometrics. The same customer biometrics may be used across many SPs. Loyalty card transactions may be performed with real-time contact with the authentication engine (on-line) or off-line in batch.

Customer can View and Update their CRM Data ("Reverse CRM")

Within the system the customer can view and update the CRM data, held about them at an SP. Access to this data can be made directly with the SP, or via the e-vault. By allowing the customer to control and update their own information, the administrative overhead of the SP managing this data directly is removed.

E-Vault can be used to Push/Pull Data from the CRM Systems

The customer e-vault repository can be used to seamlessly push and pull CRM data to/from one or more SP's. When signing up with a new SP, personal details may be automatically given to that SP from the e-vault. As data is updated in the e-vault, it may also be automatically sent to SPs who have been given permission to access that data. Similarly, as data is updated at an SP, it may be sent automatically to the customer's e-vault. Transaction records are kept at the e-vault, detailing the data transferred, and are viewable by the user.

Profiles and Permissions

The customer can configure profiles and permissions concerning CRM data held at specific SPs or groups of SPs. These profiles and permissions may be configured at individual SPs or more generically at the e-vault. The customer controls the content of data held about them, with whom it may be shared, and the automatic updating of information. The same customer biometrics may be used to control data across many SPs, without colluding SPs being able to uniquely identify that customer across their systems and therefore share data about them. The customer may give SPs permission to share data between themselves, either directly or through the e-vault.

Groups

The system can handle groups of users sharing access to the same single account at the SP. The permissions and profiles are extended to group scenarios, so that certain specific group members, or a number of members, may be required to perform specific tasks. The biometrically-enabled CRM system provides a person-centric, privacy enhancing, reverse CRM system.

It will be appreciated that the present invention as hereinbefore described provides a distributed network of independently operable servers is described. Each server is adapted to communicate over the network with one or more other servers, each server having a datastore with a plurality of datafields adapted to store information about one or more users. By enabling an authentication of a user based on a user supplied biometric identifier, the network is adapted to enable the transfer of information relating to the user between different servers. The invention is not limited to the embodiments described but may be varied in construction and detail, as will be appreciated by those skilled in the art. The words "comprises/comprising" and the words "having/including" when used herein with reference to the present invention are used to specify the presence of stated features, integers, steps or components but does not preclude the presence or addition of one or more other features, integers, steps, components or groups thereof.

The invention claimed is:

1. A customer relationship management system providing management and sharing of user information between two or more independent service providers, the customer relationship management system comprising:

a distributed network comprising a plurality of independently operable servers, each of the servers being (i) associated with a different service provider and (ii) adapted to communicate directly over the network with other servers included in the plurality of servers, each of the servers having a datastore with a plurality of datafields, each datastore adapted to store information about one or more users such that the information related to a single user is distributed across a plurality of different servers included in the network of independently operable servers; and an authentication engine provided separately from the independently operable servers and from the datastores, the authentication engine having one or more previously enrolled biometrics and being adapted to enable an authentication of the identity of a user based on a match of a user provided biometric identifier with a biometric selected from the previously enrolled biometrics, wherein the customer relationship management system is configured to enable within the network, on biometric authentication of a user, automatic communication and sharing of information relating to the user directly between two or more of the independently operable servers, and the customer relationship management system is configured to provide a centralized access point for a user to a plurality of different datastores defined for a specific user and located at different ones of the independently operable servers, such that on authentication of the identity of the user by the authentication engine the user can interface with and access data at any one of the plurality of independently operable servers without requiring additional authentication.

2. The system as claimed in claim 1, wherein:

the provision of the biometric identifier to the authentication engine by the user is via at least one of the servers; and the biometric identifier being encrypted such that only the authentication engine can obtain access to the presented biometric.

3. The system as claimed in claim 2 wherein the biometric identifier is routed directly to the authentication engine from the at least one of the servers.

4. The system as claimed in claim 2 wherein the biometric identifier is routed to the authentication engine through at least one of the other servers from the at least one of the servers.

5. The system as claimed in claim 1 wherein:
the biometric identifier is accompanied by a claim identity;
both the biometric identifier and claim identity are linkable to a unique user; and
the authentication engine utilizes both the claim identity and biometric identifier to effect authentication of the user.

6. The system as claimed in claim 1, wherein the authentication engine performs authentication of a user, where no additional user claim of identity is presented, on the basis of effecting a match between the submitted biometric identifier and at least one enrolled biometric identifier stored within the authentication engine.

7. The system as claimed in claim 1, wherein:
a first server, included in the plurality of servers, includes a generic datastore that provides a generic dataset of information relevant to the user, which may be required by others of the plurality of servers; and
the network is configured such that the first server is capable of being accessed by others of the plurality of servers.

8. The system as claimed in claim 7 wherein the first server includes configuration information relevant to how information in the network is capable of being shared between the servers.

9. The system as claimed in claim 1 further comprising a plurality of authentication engines, each of the plurality of authentication engines being adapted to communicate over a trusted communication link, whereby authentication by a user at a first authentication engine, included in the plurality of authentication engines, is capable of being accepted by a second authentication engine as authentication for that second authentication engine.

10. The system as claimed in claim 9 wherein the authentication engines are configured such that if a request for authentication of an end user is received at the first engine and the first engine is not capable of authenticating the end user, the first authentication engine is adapted to forward the request to a second authentication engine, which on authentication of the user is adapted to respond to the first authentication engine confirming authentication.

11. The system as claimed in claim 1 wherein the information relating to the one or more users is customer relationship management information.

12. The system as claimed in claim 1 wherein the plurality of servers are configured such that any updating of information in a datastore of a first server, included in the plurality of servers, is communicated to at least a second server, included in the plurality of servers, so as to update the user information therein.

13. The system as claimed in claim 1 wherein the sharing of information between servers is controlled by a set of policies and configurations determined by the user and stored at one of the servers.

14. The system as claimed in claim 1 wherein the authentication engine is configured to at least one of store and receive a plurality of templates for use in the authentication of a user, the templates varying in either the biometric sample type that was used to create that template or offering different templates for the same sample type.

15. The system as claimed in claim 14 wherein the provision of multiple templates that can then be matched against one or more presented identity claims enables the authentication engine to utilize multi-modal authentication means for a user or to use an alternative template for authentication if and when a first template is corrupted or fails to match.

16. The system as claimed in claim 2 wherein the biometric identifier is provided in a template incorporating a biometric sample or values derived from the biometric sample, the template being encrypted with a public key of the authentication engine.

17. The system as claimed in claim 1, wherein:
the authentication engine is adapted to store a plurality of datastore claim identities, each datastore claim identity being associated with one of the servers; and
on receiving a biometric identifier associated with a user from another of the servers for authentication, the authentication engine is adapted to associate the another server with at least one of the stored datastore claim identities and return an appropriate claim identity to the another server upon authentication of the user.

18. The system as claimed in claim 17 being further adapted to enable a user to register at the authentication engine a new datastore claim identity for a new server by effecting an assertion of a previously stored claim identity with the authentication engine, the assertion of the previously stored biometric identifier obviating the requirement to re-enroll the appropriate biometric identifier for association with the new datastore identity.

19. The system as claimed in claim 1, wherein:
at least one of the servers is adapted to enable a transaction to be conducted between a user and the service provider in a first time period, the completion of the transaction effecting the association of a biometric identifier uniquely associated with the user with the transaction; and
the server is adapted to enable a subsequent authentication of the associated biometric identifier by the authentication engine so as to authenticate the user.

20. The system as claimed in claim 19, wherein the transaction data is a one-way hash of a digital document to be signed by the user, and after successful authentication of that user through the authentication engine, the network is adapted to enable the construction of a user digital signature using the document hash and a server-stored user signing key.

21. The system as claimed in claim 1 adapted to enable plurality of users to conduct a simultaneous transaction, a server of the plurality of servers with which the users are interacting being configured such that the transaction is associated with a biometric identifier associated with each of the users and the transaction is only accepted once the authentication engine has authenticated each of the plurality of users.

22. A method of providing a customer relationship management system to enable a sharing of user specific information over a distributed network of a plurality of independently operable servers each being associated with a different service provider and to allow a user to access information personal to the user at any one of a number of the servers within the distributed network, said method comprising:
providing a central datastore of generic user information;
providing at each of the independently operable servers a plurality of remotely located datastores, each of the datastores having specific user information storeable thereon;
providing within the system a distinct and separate authentication engine, the authentication engine being adapted to authenticate the user on the basis of a user presented biometric identifier; and
enabling, on authentication of the user by the authentication engine, the user to access any one of the independently operable servers to at least one of retrieve and update user specific information within the datastore specific to the user, and to configure how the user specific information is to be transferred in a direct communication between respective datastores of the independently operable servers, wherein each of the remotely located datastores includes an address for the central datastore and the central datastore includes configuration information for transferring information between the distributed datastores, and on initially accessing the datastore specific to the user, the user is separately authenticated with the authentication engine and can then update information at any one of the datastores, the updating of the information effecting an updating of related information on any one of the other datastores through a direct communication between a plurality of the datastores.

23. The system as claimed in claim 1, wherein the automatic communication and sharing of information relating to the user directly between two or more of the independently operable servers is in response to authentication by the user of the two or more of the independently operable servers.

* * * * *